Patented Jan. 18, 1938

2,106,139

UNITED STATES PATENT OFFICE 2,106,139

METHALLYL-SUBSTITUTED BARBITURIC COMPOUND

Horace A. Shonle, Indianapolis, Ind., assignor to Eli Lilly and Company, Indianapolis, Ind., a corporation of Indiana No Drawing. Application November 10, 1936, Serial No. 110,133

8 Claims. (Cl. 260—33)

This present application is a substitute for and a continuation in part of my co-pending application, Serial No. 29,519, filed July 2, 1935; and is directed to certain species of the broader invention claimed in my co-pending application, Serial No. 173,531, filed November 8, 1937.

It is the main object of my present invention to produce certain 5,5-di-substituted barbituric acids, and their salts, in which one substituent is the 2-methyl-allyl, otherwise called the methallyl, group, (1)        

and the other substituent is an amyl group which has not to exceed one branching and is a member of the class consisting of the n-amyl, iso-amyl, 1-methyl-butyl, 2-methyl-butyl, and 1-ethyl-propyl groups.

An incidental object of my invention is to produce certain new intermediates. These are di-substituted malonic esters, and also mono-substituted methallyl malonic ester and barbituric acid.

These new di-substituted barbituric acids of which one substituent is the methallyl group, and their salts, which are included in this present application, all have hypnotic action; the duration of their hypnotic action varies considerably. They are all represented by the following formula:

(2)        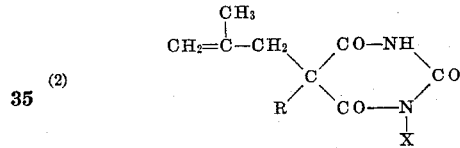

in which R represents an amyl group having not to exceed one branching; and X represents a member of the class consisting of hydrogen (if the compound is an acid), and (if the compound is a salt) an alkali metal, such as sodium, an equivalent of an alkaline-earth metal, such as calcium, ammonium, mono-alkyl ammonium, and di-alkyl ammonium, such as —NH$_3$—CH$_3$ or —NH$_2$(C$_2$H$_5$)$_2$.

These new salts and acids may be prepared in various ways, of which the following two are illustrative:

A. They may be made from certain new di-substituted malonic esters, usually ethyl esters, which are represented by the following formula:

(3)        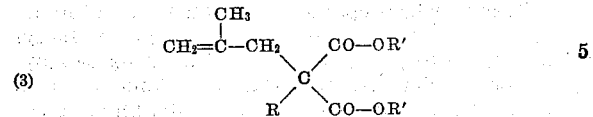

in which R has the same meaning as before, and R' represents an alkyl radical having not to exceed 3 carbon atoms, namely the methyl, ethyl, and propyl radicals, and preferably the ethyl radical. Because of this preference, in making these substituted malonic esters I prefer to work with the ethyl malonates, and so whenever I refer to a malonic ester, substituted or unsubstituted, I mean an ethyl malonate unless otherwise indicated.

B. They may be made by introducing the methallyl group into a mono-R-substituted barbituric acid.

In either of these methods, the cyanacetic ester may be used instead of the malonic ester; in which case the resulting imino-barbituric acid is converted by acid hydrolysis into the corresponding barbituric acid.

I will discuss these two methods in order, and give one or more examples under each.

Method A

In discussing Method A, I shall describe first the respective di-substituted malonic esters, then the di-substituted barbituric acids, and then the di-substituted barbiturates, and the procedures for respectively producing them.

Di-substituted malonic esters

In making the respective di-substituted malonic esters, I condense a methallyl halide with the appropriate mono-R-substituted malonic ester, or the appropriate R-halide with methallyl malonic ester, in the presence of sodium ethylate, in the manner customary for making di-substituted malonic esters. For example:

Isoamyl methallyl malonic ester

One mole of sodium is dissolved in from 10 to 12 times its weight of absolute alcohol, under a reflux condenser. One mole of isoamyl malonic ester (isoamyl ethylmalonate) is then added.

Part of the alcohol that was used to dissolve the sodium may then be removed, as by vacuum distillation, and then about 1.1 moles of methallyl chloride is gradually added. The mixture is refluxed for some hours, until it no longer shows an alkaline reaction to moist litmus paper. Most of the alcohol remaining, whether or not some had previously been removed, is now removed by vacuum distillation, leaving an oily residue. Water is added to this residue to dissolve out the sodium chloride present in it; and the oily layer, which is the desired isoamyl methallyl malonic ester, is separated and dried. This isoamyl methallyl malonic ester is purified by fractional distillation in vacuo. When so purified it is a colorless or pale-yellow liquid; which has a boiling point of 114°–117° C., uncorrected, at 2 to 3 mm. pressure. It is represented by the following formula:

(4) 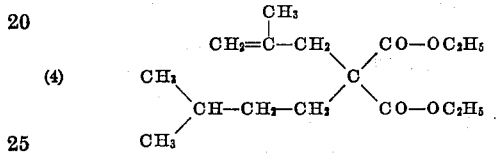

1-methyl-butyl methallyl malonic ester

This may be prepared in the same general manner as described above for isoamyl methallyl malonic ester, save that instead of using isoamyl malonic ester, 1-methyl-butyl malonic ester is used. The 1-methyl-butyl methallyl malonic ester obtained is a colorless or pale-yellow liquid; which has a boiling point of 140°–144° C., corrected, at 8 to 9 mm. pressure. (When "corrected" temperatures are given in this specification, it is meant that the temperatures are those obtained by short-stem Anschütz thermometers, as distinguished from the "uncorrected" temperatures obtained by long-stem thermometers.) It is represented by the following formula:

(5) 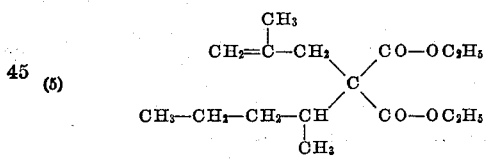

2-methyl-butyl methallyl malonic ester

This may be prepared in the same general manner as described above for isoamyl methallyl malonic ester, save that instead of using isoamyl malonic ester, 2-methyl-butyl malonic ester is used. The 2-methyl-butyl methallyl malonic ester obtained is a colorless or pale-yellow liquid; which has a boiling point of 135°–138° C., uncorrected, at about 7 mm. pressure. It is represented by the following formula:

(6) 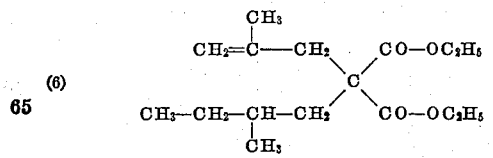

In making those di-substituted malonic esters, I may if desired start with methallyl malonic ester instead of with the amyl malonic ester, and introduce the amyl group by gradually adding the proper amyl chloride or bromide instead of the methallyl chloride. In that case the methallyl malonic ester may be prepared by condensing one mole of methallyl chloride with one mole of sodiomalonic ester, using absolute alcohol in the usual manner for preparing mono-substituted malonic esters. This ester when purified in the usual manner is a colorless or pale-yellow liquid; which has a boiling point of 93°–94° C., uncorrected, at about 3 to 4 mm. pressure. It is represented by the following formula:

(7) 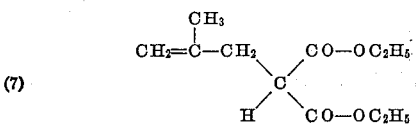

Di-substituted barbituric acids

Di-substituted barbituric acids corresponding to these various di-substituted malonic esters may be obtained. These barbituric acids are represented by the following formula:

(8) 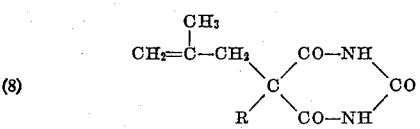

in which R has the same significance as before.

In general, the method of preparing such di-substituted barbituric acids is as follows:

Three moles of sodium are dissolved in 10 to 12 times its weight of absolute alcohol under a reflux condenser. To this are added about 1.6 moles of urea and one mole of the di-substituted malonic ester of which the corresponding barbituric acid is desired. The mixture is gently refluxed for from 12 to 15 hours, after which most of the alcohol is removed by vacuum distillation. The residue is dissolved in water, and a sufficient amount of dilute acid, such as hydrochloric acid, is added to completely throw out of solution the di-substituted barbituric acid which has been formed. This di-substituted barbituric acid comes out of solution in some cases as a solid, and in some cases as an oily liquid which solidifies on standing. The di-substituted barbituric acid so obtained is separated, as by filtration; is then dried, and may be washed with gasoline; and is then purified by recrystallization, from dilute alcohol. The barbituric acids thus obtained are all white solids, generally crystalline; are insoluble in water; and readily soluble in alcohol and ether; are bitter-tasting; and have hypnotic action.

The di-substituted barbituric acids which are obtained from the malonic esters given as examples are the following:

Isoamyl methallyl barbituric acid

This has a melting point, after recrystallization from dilute alcohol, of 143°–145° C., corrected. It is represented by the following formula:

(9) 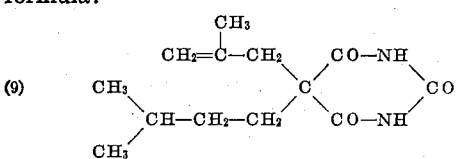

1-methyl-butyl methallyl barbituric acid

This has a melting point, after recrystallization from dilute alcohol, of 141.5°–143.5° C., corrected. It is represented by the following formula:

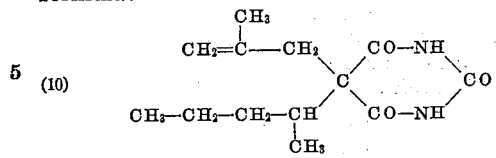

(10)

2-methyl-butyl methallyl barbituric acid

This has a melting point, after recrystallization from dilute alcohol, of 142°–144° C., corrected. It is represented by the following formula:

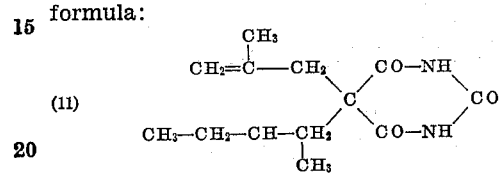

(11)

Method B

In Method B the methallyl group is introduced into a mono-R-substituted barbituric acid, where R is an amyl group of the same character as before.

The general method of doing this is as follows: One mole of the mono-R-substituted barbituric acid, (which in most instances contemplated in this application is a known mono-R-substituted barbituric acid, and in any case can be prepared in a manner analogous to that used in preparing known substituted barbituric acids,) is dissolved in a 10% to 35% aqueous solution of one mole of potassium hydroxide or sodium hydroxide. To this are added somewhat in excess of one mole of a methallyl halide, such as methallyl chloride, and alcohol in suitable amount, preferably sufficient to make a homogeneous solution. The reaction may be caused to go to completion either by agitating the mixture for 50 to 75 hours at room temperature, or slightly above, or by refluxing it for a briefer period. Then the solution, which may still exhibit two layers if the alcohol concentration is low, is freed from alcohol and from any unreacted methallyl chloride, as by vacuum distillation. On cooling, the di-substituted barbituric acid separates either as a solid or as an oily layer which solidifies on standing. This is dried, washed with petroleum ether, and dissolved in the minimum amount of benzene. The benzene solution is preferably washed with a dilute solution of sodium bicarbonate to remove any unreacted mono-substituted barbituric acid. The new di-substituted barbituric acid is extracted from the benzene solution with a dilute sodium hydroxide solution. Acidification of the extract with dilute acid, conveniently hydrochloric acid, causes the barbituric acid to precipitate in a solid or semi-solid form which crystallizes on standing. The crude barbituric acid is separated from the water, and purified by recrystallization from dilute alcohol.

Among the examples of di-substituted barbituric acids which may be prepared in this way are all those listed under Method A; and in addition the following, which may also be made by Method A:

n-Amyl methallyl barbituric acid is a white crystalline solid which after one or two recrystallizations from dilute alcohol has a melting point of 94°–96° C., corrected, and after repeated crystallizations has a melting point of 110°–112° C., corrected; and is represented by the following formula:

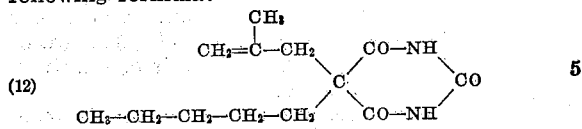

(12)

1-ethyl-propyl methallyl barbituric acid is a white crystalline solid which after recrystallization from dilute alcohol has a melting point of 183°–184° C., corrected; and is represented by the following formula:

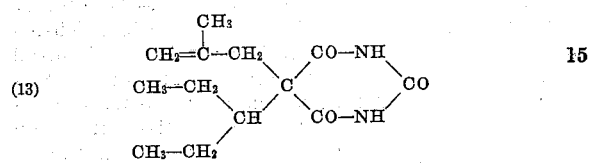

(13)

Barbiturates

All of the above-described barbituric acids are soluble in solutions of alkali-metal hydroxides and ethylates, to form the corresponding alkali-metal barbiturates in solution. The solid salts may be obtained from such solutions.

The new di-substituted barbiturates, which may all be represented by Formula 2 with X representing a metal or ammonium or a mono- or di-substituted ammonium, may perhaps best be prepared from the corresponding di-substituted barbituric acids, as by reaction in a suitable solvent with either the hydroxide or the ethylate of the desired inorganic base, or with ammonia, or with the desired alkyl amine. For instance:

*Alkali metal salts.*—The sodium salts of these di-substituted barbituric acids are all represented by the following general formula:

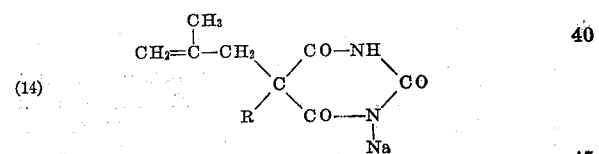

(14)

in which R has the same significance as before. The other alkali-metal salts have the same general formula, except for the substitution of the other metal for sodium. These salts are prepared as follows: A solution of one molar proportion of the hydroxide or ethylate of the alkali metal, such as sodium, is added to a suspension or solution in a suitable solvent, such as alcohol, of one molar proportion of any of the herein-contemplated di-substituted barbituric acids; which produces the desired barbiturate in solution. The amount of solvent used is desirably sufficient to dissolve the salt thus produced. The solution is filtered; and is then evaporated, preferably under vacuum at a low temperature, until the salt is obtained in solid form. The sodium salts of the various di-substituted barbituric acids given as examples are the following:

Sodium isoamyl methallyl barbiturate.
Sodium 1-methyl-butyl methallyl barbiturate.
Sodium 2-methyl-butyl methallyl barbiturate.
Sodium n-amyl methallyl barbiturate.
Sodium 1-ethyl-propyl methallyl barbiturate.

The formulas of these barbiturates are the same as those of the corresponding barbituric acids save for the substitution of sodium for hydrogen at the point corresponding to X in Formula 2.

These sodium salts are all white solids, soluble in water and alcohol, and insoluble in ether.

They are all bitter-tasting, and their aqueous solutions are alkaline in reaction. They are all excellent hypnotics, when administered either orally or hypodermically. Some of them are of particular advantage when hypnosis of relatively short duration is desired.

When these salts are desired in stable form sufficiently free from contaminants so that clear water solutions thereof suitable for intravenous injection may be obtained, they may be so obtained by the method set forth in my Patent No. 1,856,792, granted May 3, 1932.

*Ammonium and alkyl-amine salts.*—One molar proportion of any of the above-described 5,5-di-aliphatic-substituted barbituric acids is dissolved in or added to somewhat more than a molar proportion of an aqueous or alcoholic solution of concentrated ammonia or of an alkyl-amine, such for instance as mono- or di-methyl amine or mono- or di-ethyl amine. The amount of liquid used should be sufficient to ensure complete reaction. The resulting barbiturate crystallizes out or is concentrated to solid form. The formulas of these barbiturates correspond in general to the formulas of the acids, save that $NH_4$ is substituted for H at the point X of Formula 2 in the case of the ammonium salts, or the proper substituted-ammonium radical, such for instance as the methyl-ammonium radical ($-NH_3CH_3$), is substituted for that H in the case of the alkyl-amine salts.

I claim as my invention:—

1. A barbituric compound which is represented by the following formula:

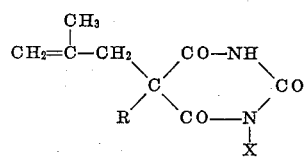

in which R represents an amyl group having not to exceed one branching; and X represents a member of the class consisting of hydrogen, an alkali metal, an equivalent of an alkaline-earth metal, ammonium, mono-alkyl ammonium, and di-alkyl ammonium.

2. A barbituric acid which is represented by the following formula:

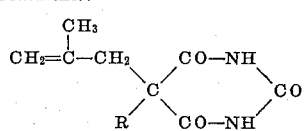

in which R represents an amyl group having not to exceed one branching.

3. A 1-methyl-butyl methallyl barbituric compound which is represented by the following formula:

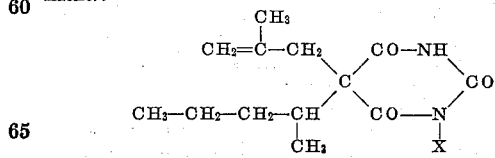

in which X represents a member of the class consisting of hydrogen, an alkali metal, an equivalent of an alkaline-earth metal, ammonium, mono-alkyl ammonium, and di-alkyl ammonium.

4. A barbituric acid which is represented by the following formula:

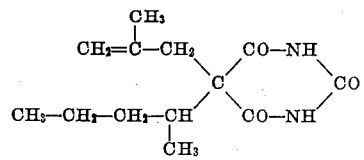

which is a white crystalline solid having hypnotic action, insoluble in water, and soluble in alcohol.

5. A 2-methyl-butyl methallyl barbituric compound which is represented by the following formula:

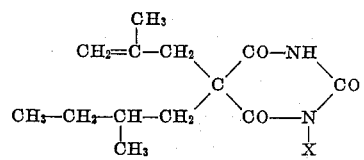

in which X represents a member of the class consisting of hydrogen, an alkali metal, an equivalent of an alkaline-earth metal, ammonium, mono-alkyl ammonium, and di-alkyl ammonium.

6. A barbituric acid which is represented by the following formula:

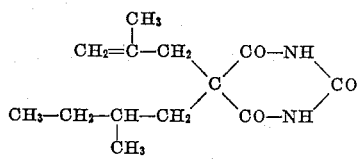

which is a white crystalline solid having hypnotic action, insoluble in water, and soluble in alcohol.

7. A sodium barbiturate which is represented by the following formula:

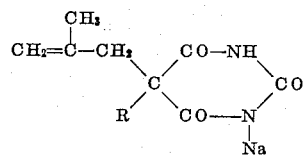

in which R represents an amyl group having not to exceed one branching.

8. Sodium 1-methyl-butyl methallyl barbiturate, which is represented by the following formula:

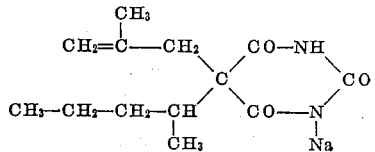

which is a white solid, soluble in water and alcohol, insoluble in ether, bitter-tasting, forms an aqueous solution which is alkaline in reaction, and has hypnotic properties.

HORACE A. SHONLE.

Certificate of Correction

Patent No. 2,106,139. January 18, 1938.

HORACE A. SHONLE.

It is hereby certified that error appears in the printed specification of the above numbered patent requiring correction as follows: Page 3, first column, line 20, in the formula, for

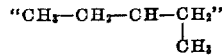

read:

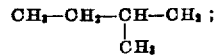

and line 75, for "crystallizations" read *recrystallizations*; and that the said Letters Patent should be read with these corrections therein that the same may conform to the record of the case in the Patent Office.

Signed and sealed this 1st day of March, A. D. 1938.

[SEAL]

HENRY VAN ARSDALE,
*Acting Commissioner of Patents.*